(12) United States Patent
Kalish et al.

(10) Patent No.: US 8,666,226 B1
(45) Date of Patent: Mar. 4, 2014

(54) SYSTEM AND METHOD FOR GENERATING PERSONAL VIDEOS

(71) Applicant: Idomoo Ltd, Hod Hashron (IL)

(72) Inventors: Danny Kalish, Raanana (IL); Assaf Fogel, Kfar-Saba (IL); Yaron Kalish, Hod-Hasharon (IL)

(73) Assignee: Idomoo Ltd, Hod Hashron (IL)

( * ) Notice: Subject to any disclaimer, the term of this patent is extended or adjusted under 35 U.S.C. 154(b) by 0 days.

(21) Appl. No.: 13/726,895

(22) Filed: Dec. 26, 2012

(51) Int. Cl.
*H04N 5/76* (2006.01)

(52) U.S. Cl.
USPC ........................................................ 386/278

(58) Field of Classification Search
USPC ........................................................ 386/278
See application file for complete search history.

(56) References Cited

U.S. PATENT DOCUMENTS 5,684,715 A * 11/1997 Palmer .......................... 348/473
2013/0304604 A1 * 11/2013 Hoffman et al. ............. 705/26.5

* cited by examiner

*Primary Examiner* — Thai Tran
*Assistant Examiner* — Nien-Ru Yang
(74) *Attorney, Agent, or Firm* — The Law Office of Michael E. Kondoudis

(57) ABSTRACT

The present invention provides a method for converting an original script code of video having relative dynamic descriptors of objects' orientation into video with absolute descriptors orientation for objects in the video. The method includes the steps of: identifying exchangeable dynamic objects in the video, parsing each frame script code for analyzing relative dynamic descriptors of objects for determining absolute descriptors values for each object, creating new script code for the video, determining the absolute descriptors values each object in each frame and generating a video template which supports the creation of customized videos by altering or exchanging dynamic objects.

24 Claims, 7 Drawing Sheets

SYSTEM AND METHOD FOR GENERATING PERSONAL VIDEOS

BACKGROUND

1. Technical Field

The present invention relates to the field of video editing.

2. Discussion of Related Art

There are various software applications for generating video in the market. In the video file of the applications the objects in each frame are described in a relation to other objects in the frame they appear in. Hence every change in a single object effect the other objects, requiring long rendering time for each change.

Therefore, there is a need to convert the video file into a new format enabling quick editing of the video file.

BRIEF SUMMARY

The present invention provides a method for converting an original script code of video having relative dynamic descriptors of objects orientation into video with absolute descriptors orientation for objects in the video. The method comprising the steps of: identifying exchangeable dynamic objects in the video, parsing each frame script code for analyzing relative dynamic descriptors of objects for determining absolute descriptors' values for each object, creating new script code for the video determining the absolute descriptors values for each object in each frame and generating a video template which supports the creation of customized videos by altering or exchanging dynamic objects.

According to some embodiments of the present invention, the method further comprises the step of classifying video to static and dynamic segments frames, wherein dynamic segments include frames with identified exchangeable dynamic objects, and wherein the parsing is applied only to the dynamic segments.

According to some embodiments of the present invention, the method further comprises the step of classifying dynamic video segments into static and dynamic layers, wherein the parsing is applied only to the dynamic layers.

According to some embodiments of the present invention, the identification of exchangeable dynamic object is performed by identifying name convention of objects.

According to some embodiments of the present invention the identification of dynamic object is performed by checking metadata of objects.

According to some embodiments of the present invention, the method further comprises the step of pre-rendering the static segments.

According to some embodiments of the present invention, the method further comprises the step of further comprising the step of merging the identified static layers into one layer.

According to some embodiments of the present invention, the generating of the video template includes integrating the static segments and new scripts of the dynamic layers with absolute values and creating descriptive list of all dynamic parameters.

According to some embodiments of the present invention, the generating of the video template further comprising the following steps: creating a list of alternative segments or optional segments base on the original script code or entered meta data and creating a descriptive list of control parameters for selecting between segments alternatives.

According to some embodiments of the present invention, the method further comprises the step of the generating of the video template includes the following steps: applying defined business rules for defining control parameters and setting values of the dynamic parameters to the video template, editing the dynamic objects based on the dynamic parameters, selecting relevant segments of the video template based control parameters and integrating and rendering selected segments with edited dynamic objects for resulting with a customized video.

According to some embodiments of the present invention, the relative object's descriptors include at least one of the following parameters: relative locations, relative orientation, focus, distance between and viewing angle of the dynamic objects, wherein the object descriptors of different objects are correlated.

According to some embodiments of the present invention the relative object's descriptors include information of the dependencies relation between the objects.

The present invention discloses a system for converting script code of a three dimensional (3D) video having relative dynamic descriptors of objects orientation into 3D video with absolute descriptors orientation for object in the video. The system is comprised of: a parsing module for identifying exchangeable dynamic objects in the video, an optimization module for parsing each frame script code of the video for analyzing dynamic descriptors of objects for determining absolute values for each descriptors including the absolute orientation values for each object in each frame and a template generation module for creating a video template which supports the creation of customized videos by altering or exchanging dynamic objects.

According to some embodiments of the present invention, the system further comprises, a video engine tool enabling to change the script code for exchanging or altering dynamic objects.

According to some embodiments of the present invention, the parsing module further classifies video to static and dynamic segments frames, wherein dynamic segments include frames with identified dynamic objects.

According to some embodiments of the present invention the parsing module further classifies dynamic video segments into static and dynamic layers.

According to some embodiments of the present invention the identification of dynamic object is performed by identifying name convention of objects.

According to some embodiments of the present invention the identification of dynamic object is performed by checking metadata of objects.

According to some embodiments of the present invention, the system further comprises a rendering module for rendering the static segments.

According to some embodiments of the present invention, the system further comprises an integration module for merging the identified static layers into one layer.

According to some embodiments of the present invention, the dynamic object's descriptors include relative locations orientation and viewing angle of the dynamic objects, wherein the object descriptors are correlated.

According to some embodiments of the present invention, the template generation module integrates the static segments and optimized scripts of the dynamic layers with absolute values and create descriptive list of all dynamic parameters.

According to some embodiments of the present invention, the template generation module further comprising the steps of: creating a list of alternative segments or optional segments base on the original script code or entered meta data and creating a descriptive list of control parameters for selecting between segments alternatives.

According to some embodiments of the present invention, the generating of the video template performs the following steps: applying defined business rules for defining control parameters and setting values of the dynamic parameters to the video template, editing the dynamic objects based on the dynamic parameters, selecting relevant segments of the video template based control parameters and integrating and rendering selected segments with edited dynamic objects for resulting with a customized video.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
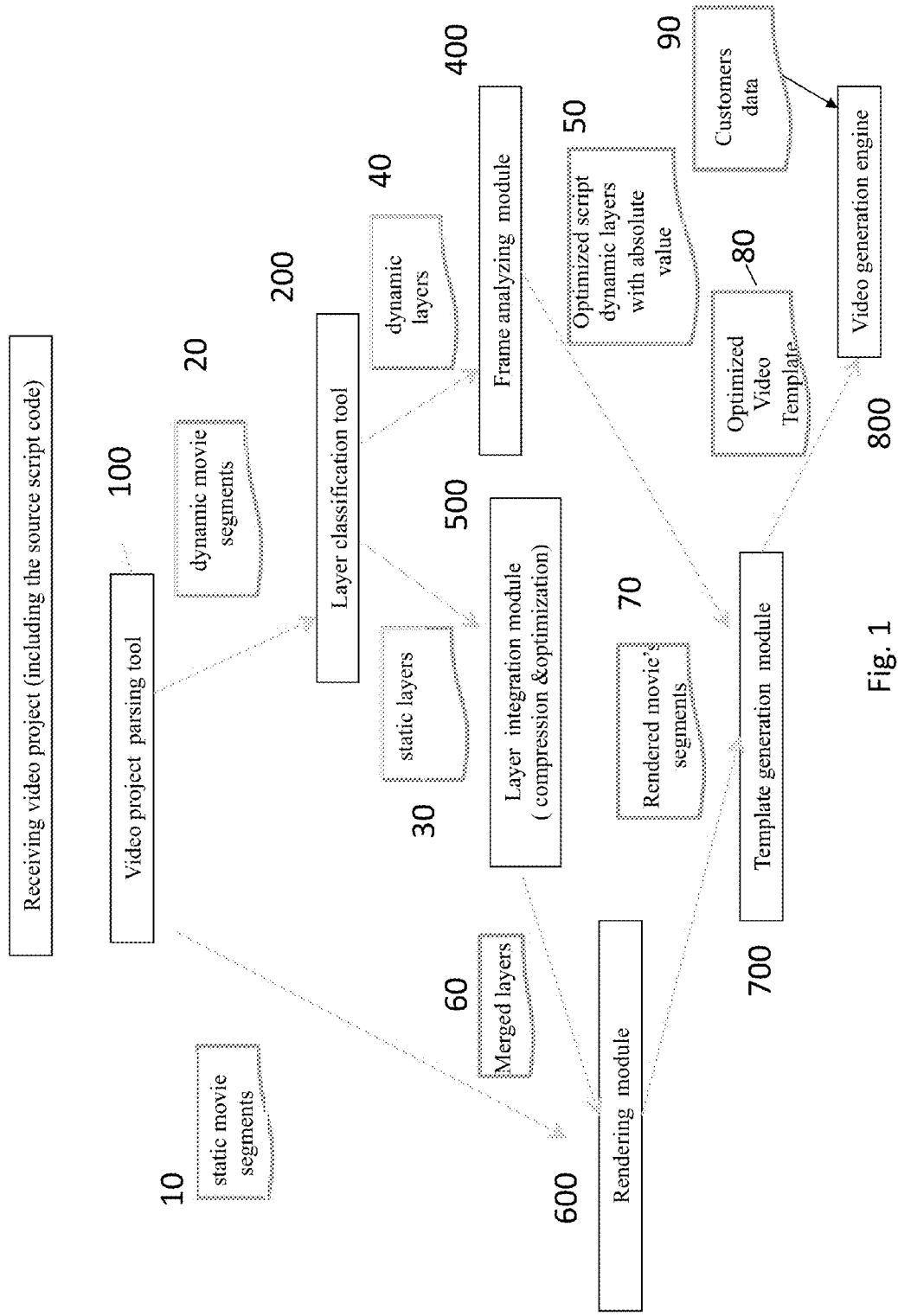
FIG. 1 is a flow-block diagram of video conversion process according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "exchangeable dynamic objects", as used herein in this application, is defined as objects which can be exchanged by other objects using simple editing tools.

The term "relative dynamic descriptors", as used herein in this application, is defined as object's descriptors which define the objects in relation to location of other objects by distance, orientation and the dependencies between the objects.

The term "Video project" as used herein in this application is defined as a video technical information which define a video production including script code and all technical parameters which effect video playing. The video project structure includes segments, and each segment includes frames which are composed of layers.

The present invention provides a new tool for converting a video script having relative dynamic descriptors for each object in the video into a video script in which the objects have absolute descriptors, enabling quick real time rendering each time an object is exchanged or altered.

The source of the video script may be "After Effects" TM software for digital motion graphics and compositing. Other equivalent software: Foundry's Nuke; Autodesk's Combustion, Toxik, Smoke, Apple's Motion; eyeon Fusion; Sony Vegas Pro; Boris RED; and the entry-level FXHome or open-source alternatives CineFX.

FIG. 1 is a flow-block diagram of video conversion process, according to some embodiments of the invention. The system according to the present invention comprises a video project parsing tool 100 which receives a video project information which include a source script code, for differentiating between static (10) and dynamic movie segments (20) of the video which include exchangeable dynamic objects. The dynamic segments 20 are conveyed to layer classification tool (200) for differentiating between static layers (30) and dynamic layers (40) which include exchangeable dynamic objects. The static layers are conveyed to integration module (compression and optimization) (500) for merging process.

The dynamic layers (40) are conveyed to frame analyzing module (400) for generating new video script by changing object's descriptors into static or absolute descriptors. The rendering module (600) receives the merged layers (60) for rendering the static movie segments (10) and merged layers (60) of the video. The template generation module (700) collects the rendered movie's segments (70) and assemble thereof with the Optimized script dynamic layers using absolute value (50), thus generating an optimized video template (80).

The optimized video template (80) can be customized using a video generating engine (800) for exchanging and altering the dynamic objects of the video and/or selecting relevant movie segments. The customizing process can be based on predefined business rules and/or customers' data (90) that is received from a clients' repository. The editing and rendering of the template are performed in minimal time period enabling almost real-time generation of customized videos.

Figure 2:
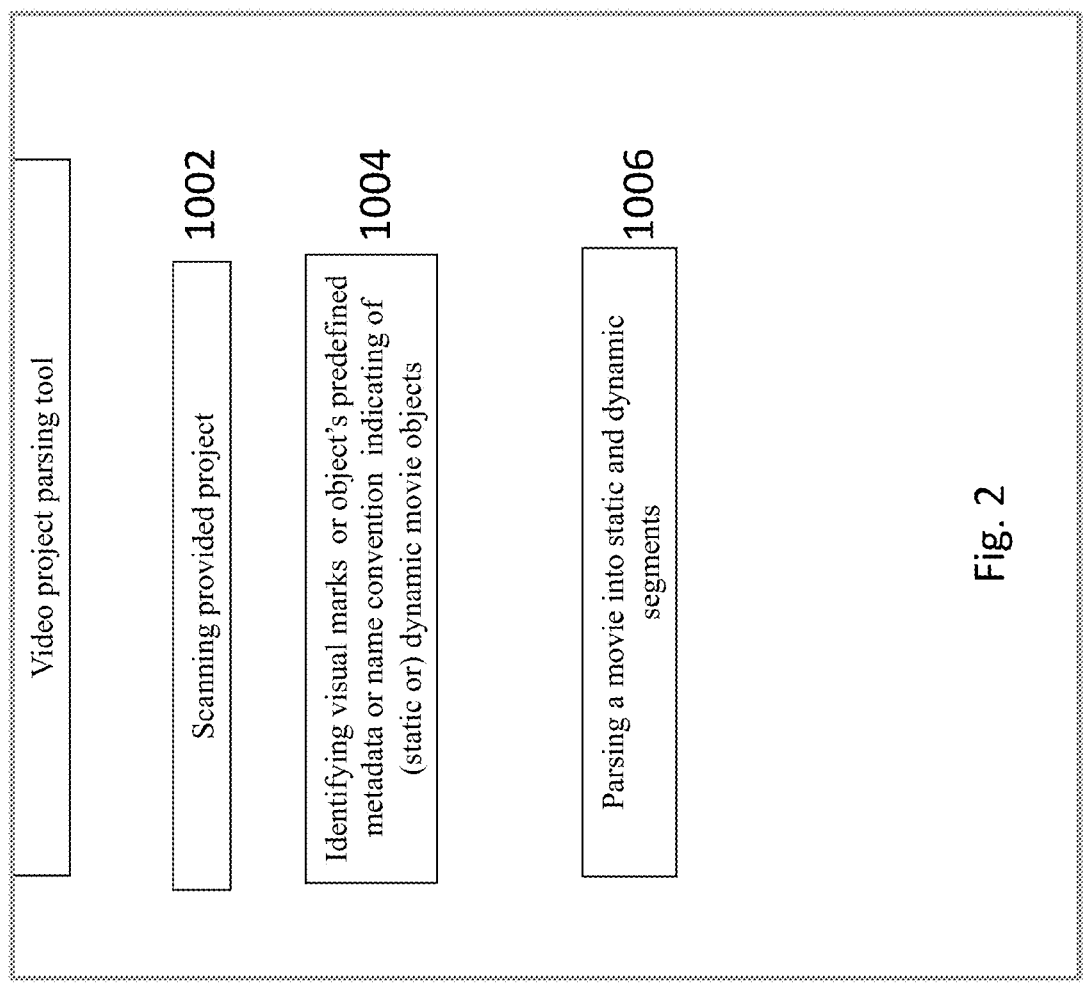
FIG. 2 is a high level flowchart illustrating Video parsing tool processing, according to some embodiments of the invention.

FIG. 2 is a high level flowchart illustrating a Video parsing tool processing, according to some embodiments of the invention. The video parsing tool scans the video (of the received video) frame by frame (1002) for identifying dynamic objects. The identification of dynamic objects (1004) can be achieved in one of the following techniques: name convention indicating of static or dynamic movie objects, in which are assigned descriptive name for the objects, indicating if the object is static or dynamic, using predefined metadata which includes a tag which indicates of object properties. The Meta data can be added in programming process. Based on the identified objects, the video is segmented into dynamic and static segments (1006).

Figure 3:
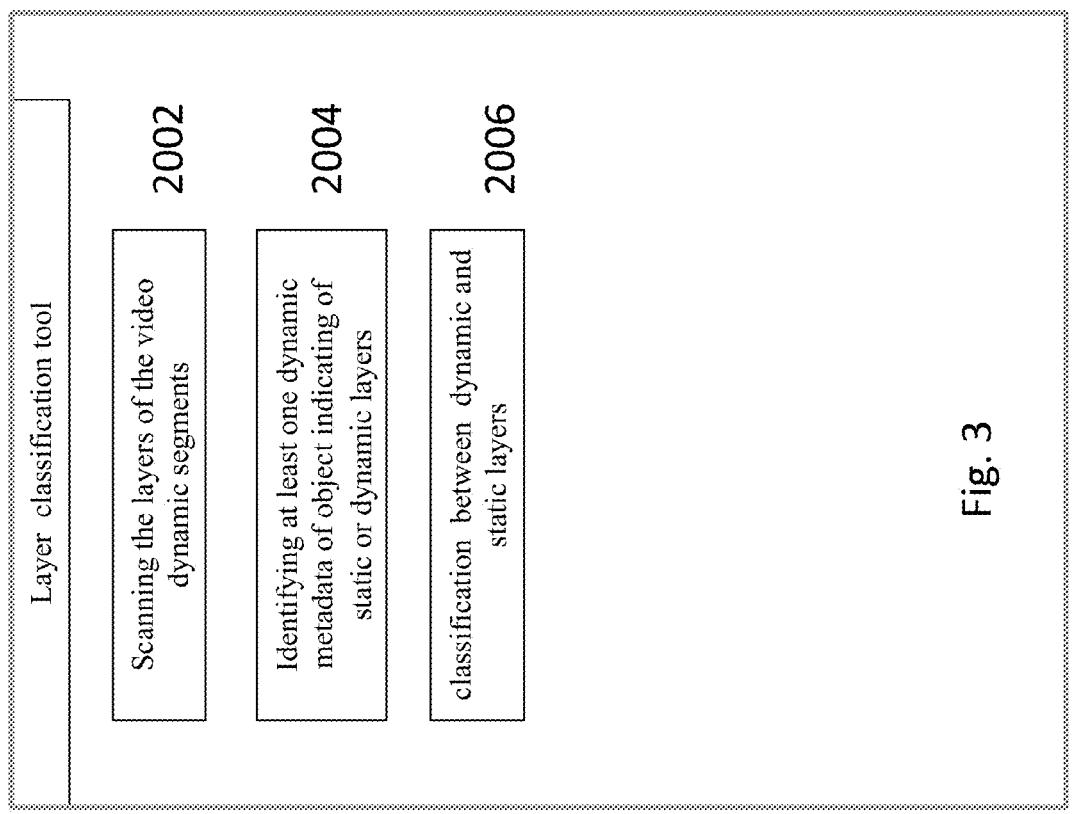
FIG. 3 is a high level flowchart illustrating a Layer classification tool processing, according to some embodiments of the invention.

FIG. 3 is a high level flowchart illustrating a layer classification tool processing, according to some embodiments of the invention. This module scans the layers of each video frame of each dynamic segment (2002), throughout the scanning are identified at least one dynamic metadata of object indicating of static or dynamic layers (2004). Each layer having an exchangeable dynamic object is classified as dynamic (2006), other layers are classified as static layers.

Figure 4:
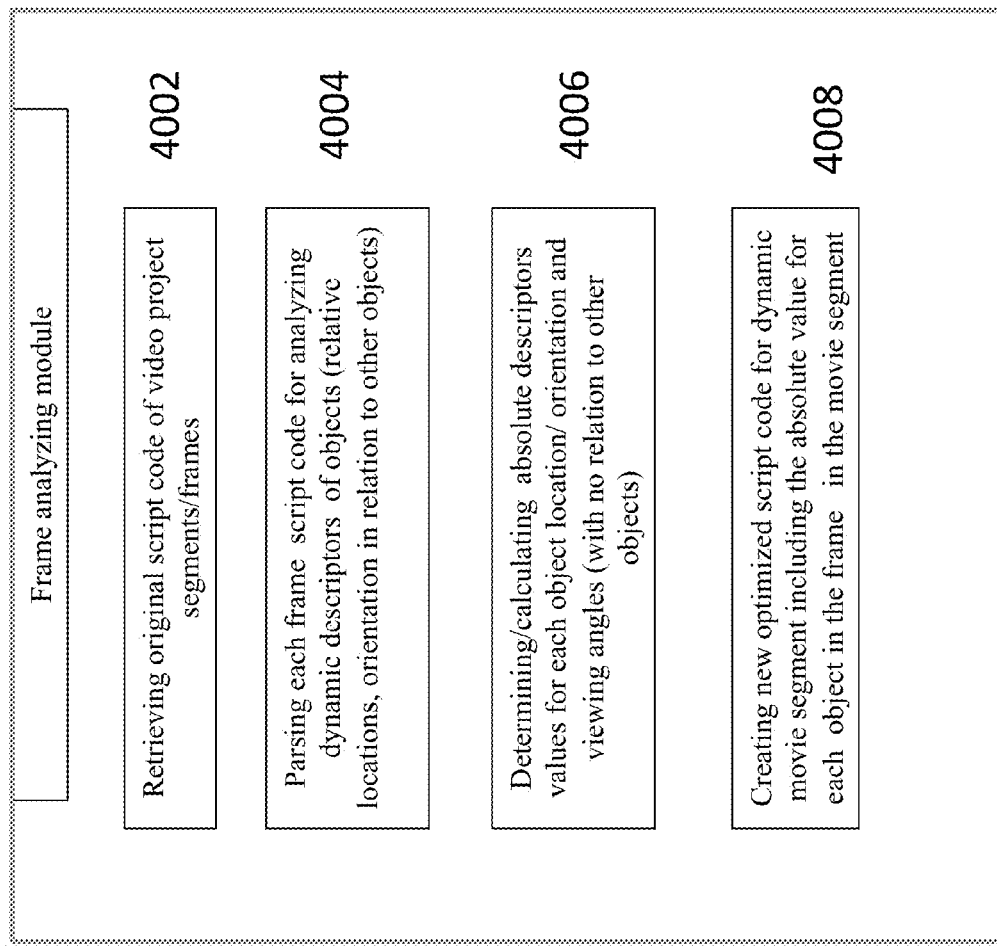
FIG. 4 is a high level flowchart illustrating a frame analyzing module processing, according to some embodiments of the invention.

FIG. 4 is a high level flowchart illustrating a frame analyzing module processing, according to some embodiments of the invention. The analyzing module receives an original script code of video project frames of the dynamic layers (4002), each frame of script code is parsed for analyzing (4004) the relative dynamic descriptors of objects which describe relative locations, distance orientation and viewing angles in relation to other objects.

The relative dynamic descriptors may further include information of the dependencies relation between the objects. Based on analyzed information of the relative dynamic descriptors, of each object, are calculated the absolute values of locations, orientation, focus and viewing angles of each object in each frame. The calculation is based on simulating the behavior of all the objects based on the descriptive parameters, in one frame for deducing the absolute values of each object (4006). Based on calculated absolute values an optimized new script code of the video, is created (4008). The new optimized script code for dynamic movie segment may include the absolute values for each object in the frame in the movie segment.

Figure 5:
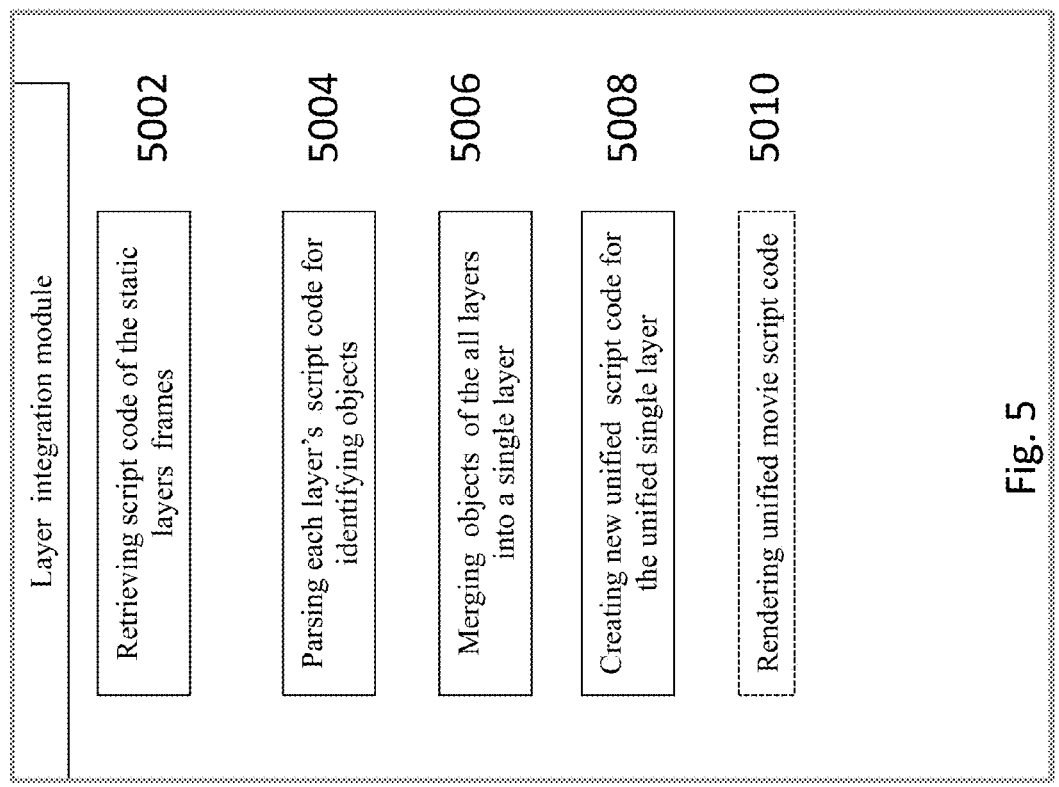
FIG. 5 is a high level flowchart illustrating Layer integration module processing, according to some embodiments of the invention.

FIG. 5 is a high level flowchart illustrating Layer integration module processing, according to some embodiments of the invention. The module retrieves script code of the static layers video segments frames (5002), each layer script code (5004) is parsed for identifying all objects within the layer. The scripts codes of all layers and all objects (5006) are merged for creating new unified script code for the unified layer (5008) containing all descriptors objects data of all layers.

At the final stage the unified static layer is integrated with the new created script code of the dynamic layers for creating a video template in which all dynamic objects can be altered or exchanged, with no need to render all the video parts. The video template can be used by designated video tool for creating customized video tools by exchanging one or more dynamic object.

Figure 6:
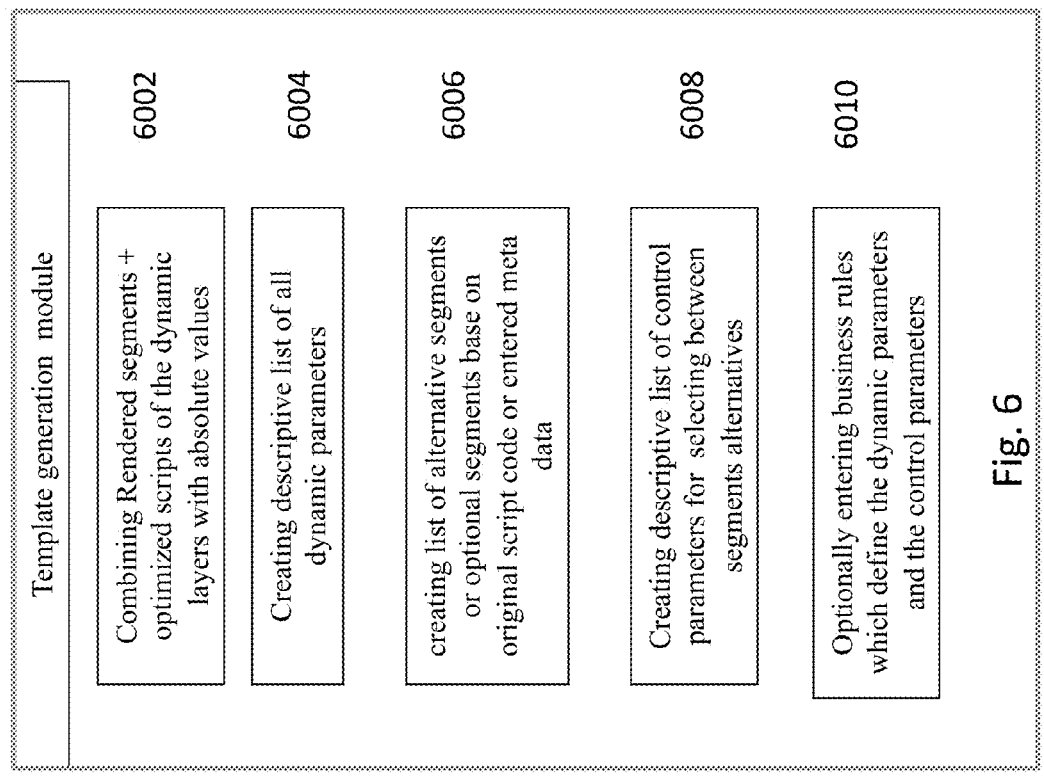
FIG. 6 is a high level flowchart illustrating template generating module processing, according to some embodiments of the invention.

FIG. 6 is a high level flowchart illustrating the template generating module processing, according to some embodiments of the invention. At the first step, rendered segments and the optimized scripts of the dynamic layers are combined with absolute values into a single video template (step 6002), at the next step a descriptive list of all dynamic parameters is created according to identified exchangeable dynamic objects (step 6004), this list is used to indicate which objects can be exchanged or altered when generating the final customized video.

Optionally, a list of alternative segments or optional segments is created base on original script code or entered metadata. These segments are used for selection, when customizing the video according to target user profile (step 6006). For example, alternative segments may refer to target customers of different ages, optional segments, may refer to customers of different billing programs. Based on the segments list descriptive list of control parameters is created for selecting between segments alternatives (step 6008). Optionally, business rules may be entered into the templates. The business rules enable to define the dynamic parameters and the control parameters based on customized data (step 6010).

Figure 7:
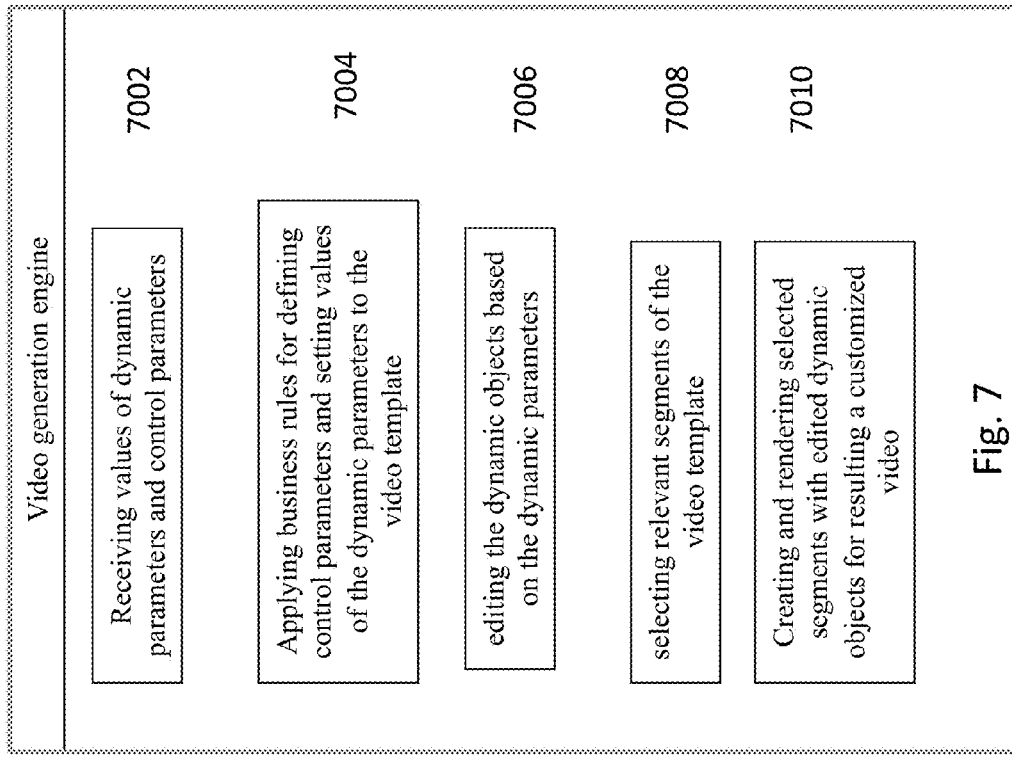
FIG. 7 is a high level flowchart illustrating video generating engine processing, according to some embodiments of the invention.

FIG. 7 is a high level flowchart illustrating the video generating engine processing, according to some embodiments of the invention. At the first step business rules and values of dynamic parameters and control parameters are received (step 7002), the business rules may be a profile of a user or Customer Relationship Management (CRM) data which are inserted or exported from an external database. The business rules are applied onto the video template (steps 7004 and 7006) by defining the control parameters and inserting values of dynamic parameters.

Based on the dynamic parameters the dynamic objects of the template are edited (step 7006). Based on the control parameters the relevant segments of the video template are selected (step 7008). Accordingly, a customized video of the relevant selected segments which include customized dynamic exchangeable objects is generated and rendered (step 7010).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method for converting an original script code of video having relative dynamic descriptors of objects orientation into video with absolute descriptors orientation for objects in the video, said method comprising the steps of:
    identifying exchangeable dynamic objects in the video;
    parsing each frame script code for analyzing relative dynamic descriptors of objects;
    determining absolute descriptors' values for each object based on analysis of the relative dynamic descriptors of objects;
    creating new script code for the video determining the absolute descriptors values for each object in each frame; and
    generating a video template which supports the creation of customized videos by altering or exchanging dynamic objects.

2. The method of claim 1, further comprising the step of classifying video to static and dynamic segments frames, wherein dynamic segments include frames with identified exchangeable dynamic objects, and wherein the parsing is applied only to the dynamic segments.

3. The method of claim 2, further comprising the step of classifying dynamic video segments into static and dynamic layers, wherein the parsing is applied only to the dynamic layers.

4. The method of claim 1, wherein the identification of exchangeable dynamic object is performed by identifying name convention of objects.

5. The method of claim 1, wherein the identification of dynamic object is performed by checking metadata of objects.

6. The method of claim 2, further comprising the step of pre-rendering the static segments.

7. The method of claim 3, further comprising the step of merging the identified static layers into one layer.

8. The method of claim 1, wherein the generating of the video template includes integrating the static segments and new scripts of the dynamic layers with absolute values and creating descriptive list of all dynamic parameters.

9. The method of claim 8, wherein the generating of the video template further comprising the following steps:
    creating a list of alternative segments or optional segments base on the original script code or entered meta data; and
    creating a descriptive list of control parameters for selecting between segments alternatives.

10. The method of claim 1, wherein the generating of the video template includes the following steps:
    applying defined business rules for defining control parameters and setting values of the dynamic parameters to the video template;
    editing the dynamic objects based on the dynamic parameters;
    selecting relevant segments of the video template based control parameters; and
    integrating and rendering selected segments with edited dynamic objects for resulting with a customized video.

11. The method of claim 1, wherein the relative object's descriptors include at least one of the following parameters: relative locations, relative orientation, focus, distance between and viewing angle of the dynamic objects, wherein the object descriptors of different objects are correlated.

12. The method of claim 1, wherein the relative object's descriptors include information of the dependencies relation between the objects.

13. A system for converting script code of a three dimensional (3D) video having relative dynamic descriptors of objects orientation into 3D video with absolute descriptors orientation for object in the video, said system comprised of:
    a parsing module for identifying exchangeable dynamic objects in the video;
    an optimization module for parsing each frame script code of the video for analyzing dynamic descriptors of objects for determining absolute values for each descriptors including the absolute orientation values for each object in each frame; and
    a template generation module for creating a video template which supports the creation of customized videos by altering or exchanging dynamic objects.

14. The system of claim 13, further comprising a video engine tool enabling to change the script code for exchanging or altering dynamic objects.

15. The system of claim 13, wherein the parsing module further classifies video to static and dynamic segments frames, wherein dynamic segments include frames with identified dynamic objects.

16. The system of claim 13, wherein the parsing module further classifies dynamic video segments into static and dynamic layers.

17. The system of claim 13, wherein the identification of dynamic object is performed by identifying name convention of objects.

18. The system of claim 13, wherein the identification of dynamic object is performed by checking metadata of objects.

19. The system of claim 13, further comprising a rendering module for rendering the static segments.

20. The system of claim 13, further an integration module for merging the identified static layers into one layer.

21. The system of claim 13, wherein the dynamic object's descriptors include relative locations orientation and viewing angle of the dynamic objects, wherein the object descriptors are correlated.

22. The system of claim 13, wherein the template generation module integrates the static segments and optimized scripts of the dynamic layers with absolute values and create descriptive list of all dynamic parameters.

23. The system of claim 22, wherein the generating the template generation module further comprising the steps of:

creating a list of alternative segments or optional segments base on the original script code or entered meta data; and creating a descriptive list of control parameters for selecting between segments alternatives.

24. The system of claim 14, wherein the generating of the video template performs the following steps:

applying defined business rules for defining control parameters and setting values of the dynamic parameters to the video template;

editing the dynamic objects based on the dynamic parameters;

selecting relevant segments of the video template based control parameters; and integrating and rendering selected segments with edited dynamic objects for resulting with a customized video.

* * * * *